US012220836B2

(12) United States Patent
Mayes et al.

(10) Patent No.: US 12,220,836 B2
(45) Date of Patent: Feb. 11, 2025

(54) MODIFIED WOOD PRODUCT AND A PROCESS FOR PRODUCING SAID PRODUCT

(71) Applicant: Stora Enso OYJ, Helsinki (FI)

(72) Inventors: Duncan Mayes, Helsinki (FI); Janne Pynnönen, Espoo (FI); Reeta-Maria Stöd, Ylämylly (FI)

(73) Assignee: Stora Enso OYJ, Helsinki (FI)

( * ) Notice: Subject to any disclaimer, the term of this patent is extended or adjusted under 35 U.S.C. 154(b) by 454 days.

(21) Appl. No.: 15/764,050

(22) PCT Filed: Sep. 28, 2016

(86) PCT No.: PCT/IB2016/055796
§ 371 (c)(1),
(2) Date: Mar. 28, 2018

(87) PCT Pub. No.: WO2017/056013
PCT Pub. Date: Apr. 6, 2017

(65) Prior Publication Data
US 2019/0054650 A1 Feb. 21, 2019

(30) Foreign Application Priority Data

Sep. 29, 2015 (SE) .................................. 1551246-0

(51) Int. Cl.
| | | |
|---|---|---|
| *B27K 5/00* | (2006.01) | |
| *B27K 3/15* | (2006.01) | |
| *C08G 8/10* | (2006.01) | |
| *C09D 15/00* | (2006.01) | |
| *C09D 161/06* | (2006.01) | |
| *C08G 14/08* | (2006.01) | |
| *C08L 61/06* | (2006.01) | |
| *C08L 61/28* | (2006.01) | |
| *C08L 61/34* | (2006.01) | |
| *C08L 97/00* | (2006.01) | |
| *C08L 97/02* | (2006.01) | |

(52) U.S. Cl.
CPC .............. *B27K 5/0085* (2013.01); *B27K 3/15* (2013.01); *C08G 8/10* (2013.01); *C09D 15/00* (2013.01); *C09D 161/06* (2013.01); *B27K 2240/20* (2013.01); *C08G 14/08* (2013.01); *C08L 61/06* (2013.01); *C08L 61/28* (2013.01); *C08L 61/34* (2013.01); *C08L 97/005* (2013.01); *C08L 97/02* (2013.01)

(58) Field of Classification Search
CPC .... B27K 5/0085; B27K 3/15; B27K 2240/20; C08G 8/10; C08G 14/08; C09D 15/00; C09D 161/06; C08L 61/06; C08L 61/28; C08L 61/34; C08L 97/005; C08L 97/02
See application file for complete search history.

(56) References Cited

U.S. PATENT DOCUMENTS

| | | | |
|---|---|---|---|
| 2,350,135 A * | 5/1944 | Stamm ..................... | B27K 3/08 427/365 |
| 2,740,728 A | 4/1956 | Sonnabend et al. | |
| 4,486,475 A | 12/1984 | Shutov et al. | |
| 4,678,715 A | 7/1987 | Giebeler et al. | |
| 2004/0115460 A1* | 6/2004 | Torgovnikov ....... | B27K 3/0221 428/541 |
| 2004/0146733 A1 | 7/2004 | Fritschi et al. | |
| 2008/0223360 A1 | 9/2008 | Kingma et al. | |
| 2013/0298814 A1 | 11/2013 | Militz et al. | |
| 2018/0265665 A1* | 9/2018 | Mayes ................... | C08J 9/0076 |

FOREIGN PATENT DOCUMENTS

| | | | | |
|---|---|---|---|---|
| EP | 1370400 A1 | 12/2003 | | |
| JP | H0775843 B2 | 8/1995 | | |
| WO | WO-2008155466 A1 * | 12/2008 | ............. | C08L 97/02 |
| WO | 2010054467 A1 | 5/2010 | | |
| WO | 2011096812 A1 | 8/2011 | | |
| WO | WO-2012153183 A1 * | 11/2012 | ............... | B27K 3/15 |

OTHER PUBLICATIONS

Sandberg et al. "Thermo-hydro and thermo-hydro-mechanical wood processing: An opportunity for future environmentally friendly wood products" Wood Material Science & Engineering, 8:1, 64-88. (Year: 2013).*
Haygreen et al. "Improving the Properties of Particleboard by Treating the Particles with Phenolic Impregnating Resin" Wood and Fiber V. 3(2) 1971.*
Gabrielli, C.P. et al. "Phenol-formaldehyde impregnation of densified wood for improved dimensional stability".
O'Connor, J.P. "Improving Wood Strenght and Stiffness through Viscoelastic Thermal Compression".
International Searching Authority, International Search Report, PCT/IB2016/055796, Apr. 21, 2017.
International Searching Authority, Written Opinion of the International Searching Authority, PCT/IB2016/055796, Apr. 21, 2017.
Yu Xian Chun, et al., "Wood: Adhesives and Gluing Technology," Mar. 1, 2011, 11-12, 154-155, China Light Industry Press. Two English language synopses included.

* cited by examiner

*Primary Examiner* — Robert S Walters, Jr.
(74) *Attorney, Agent, or Firm* — Greer, Burns & Crain, Ltd.

(57) ABSTRACT

The present invention relates to a process for preparing a modified wood product wherein a step of resin treatment is followed by a thermal modification step. The present invention also relates to a modified wood product produced using said process.

18 Claims, No Drawings

MODIFIED WOOD PRODUCT AND A PROCESS FOR PRODUCING SAID PRODUCT

FIELD OF THE INVENTION

The present invention relates to a process for preparing a modified wood product wherein a step of resin treatment is followed by a thermal modification step. The present invention also relates to a modified wood product produced using said process.

BACKGROUND

Many wood species that are untreated are very susceptible to influences caused by the external environment. Untreated wood that is exposed to moisture and/or soil for sustainable periods of time will become weakened by attacks by various types of microorganisms or insects. It is therefore of importance to treat the less durable wood in order to increase its resistance against moisture and fungal attack. In addition wood which is exposed to Ultra Violet radiation is susceptible to discoloration and deterioration.

There exist a number of different treatment methods which will increase the resistance of wood. Chemical treatments of wood in order to increase the biological durability and strength have been used for a long time. Many different chemicals may be added. These chemicals are normally called fungicides and they will provide long-term resistance to organisms that cause deterioration of the wood. If it is applied correctly, it can extend the productive life of timber by five to ten times.

Another known method to improve the resistance of wood is to treat the wood at high temperatures to thermally modify the wood. During heat modification, certain organic compounds found in the wood will be removed and thereby decreases the possibility for fungi and rot to thrive on the wood. Thus, by heating wood to a certain temperature, it may be possible to make the ligno-cellulosic fibers less appetizing to fungi and insects. Heat modification can also improve the properties of the wood with respect to moisture both liquid and humidity, i.e. lower equilibrium moisture content, less moisture deformation, and improved weather resistance. One potential downside of thermally modified wood is the reduction in strength both in bending strength and surface hardness as a result of the modification process which might reduce the useful service life of the material.

WO2008/155466 A1 discloses a process wherein thermally modified wood is impregnated with resin, followed by a drying and/or curing step. Thus, the resin treatment is carried out on wood with low moisture content.

RU2008139647 discloses a process wherein a carbamide-formaldehyde oligomer is used in an impregnation step at elevated pressure, followed by a drying step, followed by treatment with a pulsed magnetic field, followed by heat treatment at 140° C. to 160° C.

U.S. Pat. No. 4,486,475 discloses a process that comprises the steps of impregnating wood with a modifying system, drying the impregnated wood in a hydrophobic heat transfer agent and curing the impregnation system in the wood. The drying and curing processes are being carried out under vacuum or reduced pressure in the same autoclave and with the same hydrophobic heat transfer agent, while raising the temperature of the heat transfer agent from 40° C. to 140° C.

There is thus a need for an improved modified wood product. There is also a need for improved processes for preparing modified wood products.

SUMMARY OF THE INVENTION

It is an object of the present invention to provide a wood product having improved properties, such as higher stability, surface hardness and biological stability.

Another object of the present invention is to provide a process for producing said modified wood in an efficient way.

These objects and other advantages are achieved by the process and the product according to the independent claims.

The present invention relates to a process for preparing a modified wood product, wherein a step of resin treatment is followed by a thermal modification step. The present invention also relates to a modified wood product obtainable by said process.

The resin solution used in the process according to the present invention comprises phenol formaldehyde, phenol urea formaldehyde, a melamine resin, lignin, tannin or a mixture thereof.

The moisture content of the wood used in the process according to the present invention is at least 10%.

During the thermal modification step, the wood is heated at a temperature of from 160° C. to 230° C. at atmospheric pressure or at a temperature of from 120° C. to 230° C. at a pressure higher than atmospheric pressure.

The present invention also relates to wood treated according to the process described above. The wood produced will have increased strength and less fiber loosening. In one embodiment of the present invention, the treated wood is softwood. In one embodiment of the present invention, the treated wood is hardwood.

DETAILED DESCRIPTION

The invention relates to a process for preparing modified wood wherein a step of resin treatment is followed by a thermal modification step.

By treating the wood with a resin prior to thermal modification, it is possible to obtain improved stability, surface hardness and biological stability. Furthermore, the process according to the present invention does not require any separate drying or curing step after the resin treatment, thereby improving process efficiency.

The wood used in the process according to the present invention is, in one embodiment, green never dried wood.

The moisture content of the wood used in the process according to the present invention is at least 10%. In one embodiment of the present invention, the moisture content is from 10% to 20%. In a further embodiment, the moisture content is from 11% to 15%, such as from 12% to 14%. In a further embodiment, the moisture content is about 12%. In one embodiment, the moisture content is close to the fiber saturation point. The moisture content as well as the fiber saturation point of wood can be determined using methods known in the art.

In one embodiment of the present invention, the resin treatment is done at elevated pressure, i.e. above 1 bar, during room temperature or ambient temperature, such as from 20° C. to 50° C. or from 20° C. to 40° C. In one embodiment, the pressure resin treatment is performed in vacuum or at a lower pressure than atmospheric pressure.

During the subsequent thermal modification, full curing and crosslinking of the resin takes place.

The resin solution is normally an aqueous solution containing from 1% to 50% by weight of resin. In one embodiment of the present invention, the resin solution contains from 10% to 15% of resin. The pH of the resin solution is generally in the range of from pH 3 to pH 7. The resin solution may optionally contain additional components such as pigments, surfactants, curing agents, pH stabilizers and fire retardants.

The resin solution can be applied on the wood by brushing, injecting, spraying, dipping or by immersion. The quantity of resin applied on the wood can be 10-400 g/m$^2$, advantageously 10-150 g/m$^2$, preferably 30-100 g/m$^2$ and most advantageously about 50 g/m$^2$, when calculated as hardened from dry matter.

The thermal modification step can be done in an essentially oxygen free environment. This can be an advantage if high temperatures are used since wood easily ignites at high temperatures but the absence of oxygen will eliminate that risk.

During the thermal modification step, the wood is heated at a temperature of from 160° C. to 230° C. at atmospheric pressure or at a temperature of from 120° C. to 230° C. at a pressure higher than atmospheric pressure. In one embodiment, the temperature is between 200° C. and 230° C. at atmospheric pressure.

The time required for the thermal modification step depends on the wood used, but is generally in the range of from 30 seconds to 5 hours, such as about 1 hour to 2 hours. The process parameters chosen for the thermal modification of the wood depends on the wood used and on the end use of the final wood product.

In one embodiment, a temperature gradient is used during the thermal modification step. In this embodiment, the wood is first heated to a consistent temperature throughout the cross section of the wood pieces, followed by a rapid cooling to create a temperature gradient whereby the core of the wood has a higher temperature than the surface.

In one embodiment, of the present invention, the wood may be densified during or after the thermal modification step. The densification may be done by applying pressure to the wood. The densification may be done at a pressure of 1-3 kg/cm$^2$ and the maximum compression should be about 10% of the thickness of the wood.

For densification, it is preferred to apply both pressure and heat, since this combination will improve the densification of the wood. The densification may be done off-line, on-line or in-line, i.e. in-line with the process according to the invention. If off-line densification is used, it is possible to use a hot press after the thermal modification step. If in-line densification is used it is possible to use roller or plate based systems. The densification can be done during the thermal modification step or after the thermal modification step.

By densifying the wood, the surface of the wood will become more set, i.e. the fibers on the surface have less tendency to react with moisture and retain its original form. This also leads to reduced tendency of fiber loosening on the surface of the wood. The surface density and thus also the hardness of the wood will also be improved.

The present invention also relates to wood treated according to the process described above. The wood produced will have improved stability, surface hardness and biological stability increased strength and less fiber loosening. It is preferred that the treated wood is softwood. However, it is also possible to treat other kind of wood with the process according to the invention, such as hardwood.

The produced wood can be used for the production of many different products, such as cladding, decking, light poles, jetties, joinery, furniture etc.

The term "solid wood" as used herein is defined as a solid wood component of any kind of wood species The produced modified wood product can be used for the production of many different products, such as cladding, decking, window and door profiles, light poles, jetties, joinery, furniture etc.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for preparing modified wood comprising the steps of
    a. resin treatment of never dried solid wood having a moisture content of at least 10%, wherein the resin solution comprises at least one of the group consisting of phenol formaldehyde, phenol urea formaldehyde, a melamine resin, lignin, tannin or a mixture thereof, wherein a quantity of the resin applied is 10-400 g/m$^2$, followed by
    b. a thermal modification step wherein the wood is heated at a temperature of from 160° C. to 230° C. at atmospheric pressure for a time of 1 to 5 hours in an essentially oxygen-free environment wherein curing and crosslinking of the resin takes place.

2. A process according to claim 1, wherein the wood has a moisture content of about 12%.

3. A process according to claim 1, wherein the wood has a moisture content of approximately the fiber saturation point.

4. A process according to claim 1, wherein the resin is phenol-formaldehyde.

5. The process of claim 1 wherein the wood is heated to obtain a consistent temperature throughout a cross section of the wood, followed by cooling to obtain a temperature gradient in which a core of the wood has a higher temperature than a surface of the wood.

6. The process of claim 1 wherein the moisture content is in the range of 10% to 20%.

7. The process of claim 1 wherein the resin treatment takes place at a temperature of 20° C. to 50° C. and a pressure above 1 bar.

8. The process of claim 1 wherein the wood is heated for the time of 1 to 2 hours.

9. The process of claim 1 wherein the quantity of the resin applied is 10-150 g/m$^2$.

10. The process of claim 1 wherein the quantity of the resin applied is 10-100 g/m$^2$.

11. The process of claim 1 wherein the quantity of the resin applied is 10-50 g/m$^2$.

12. A process for preparing modified wood comprising the steps of
    a. resin treatment of never dried solid wood having a moisture content of at least 10%, wherein the resin solution comprises at least one of the group consisting of phenol formaldehyde, phenol urea formaldehyde, a melamine resin, lignin, tannin or a mixture thereof, wherein a quantity of the resin applied is 10-400 g/m$^2$, and wherein the resin treatment takes place at a temperature of 20° C. to 50° C. and a pressure above 1 bar, followed by b. a thermal modification step wherein the wood is heated at a temperature of from 160° C. to 230° C. at atmospheric pressure for a time of 1 to 5 hours in an essentially oxygen-free environment wherein curing and crosslinking of the resin takes place.

13. The process of claim 12 wherein the wood is heated for the time of 1 to 2 hours.

14. The process of claim 12 wherein the wood is heated to obtain a consistent temperature throughout a cross section of the wood, followed by cooling to obtain a temperature gradient in which a core of the wood has a higher temperature than a surface of the wood.

15. The process of claim 12 wherein the moisture content is in the range of 10% to 20%.

16. The process of claim 12 wherein the quantity of the resin applied is 10-150 $g/m^2$.

17. The process of claim 12 wherein the quantity of the resin applied is 10-100 $g/m^2$.

18. The process of claim 12 wherein the quantity of the resin applied is 10-50 $g/m^2$.

\* \* \* \* \*